(No Model.)
W. M., J. A. D. & N. M. MacKEAN.
PROCESS OF DEGERMING MAIZE OR OTHER CEREALS.
No. 587,676.      Patented Aug. 3, 1897.
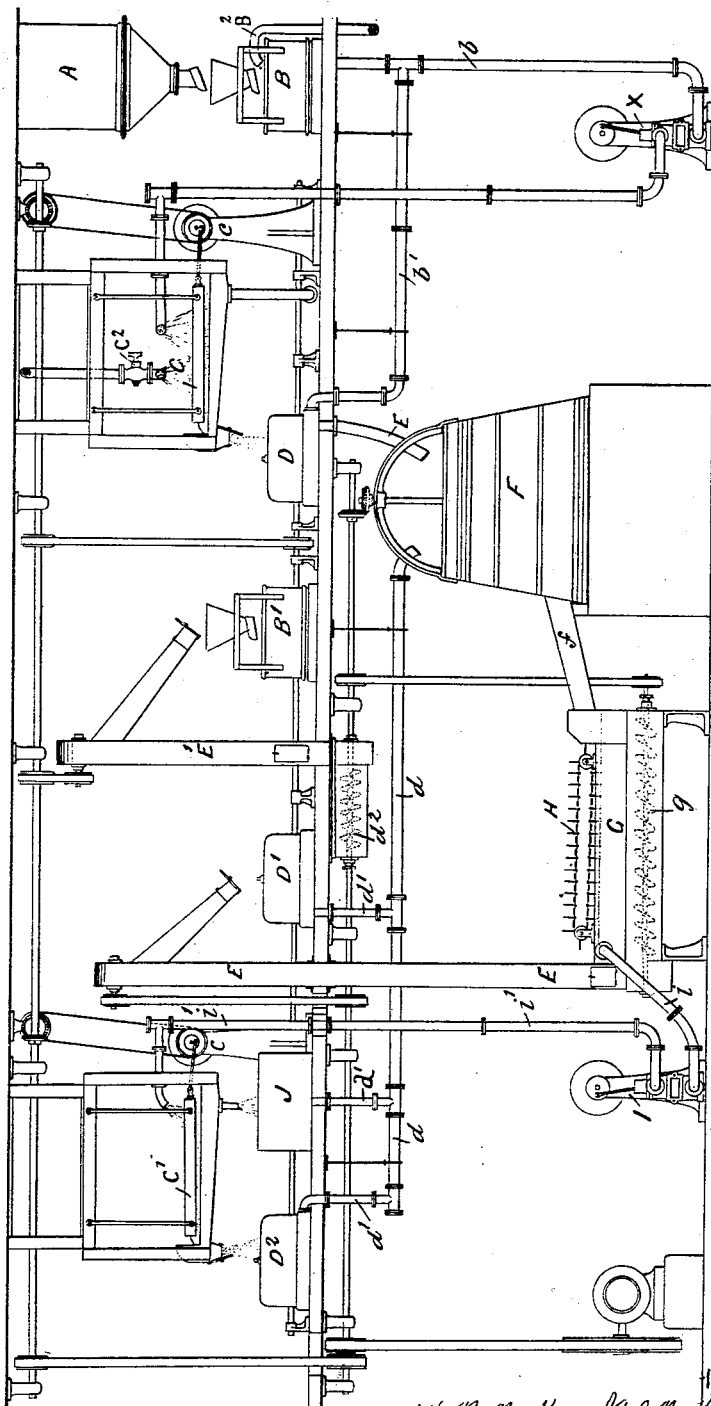
WITNESSES-
P. W. Wright.
S. C. Connor.
INVENTORS-
W. M. MacKean, J. A. D. MacKean & N. M. MacKean
BY Howson and Howson
-THEIR ATTORNEYS-

UNITED STATES PATENT OFFICE.

WILLIAM MUIR MacKEAN, JAMES ANDERSON DUNLOP MacKEAN, AND NORMAN MacGREGOR MacKEAN, OF PAISLEY, SCOTLAND.

PROCESS OF DEGERMING MAIZE OR OTHER CEREALS.

SPECIFICATION forming part of Letters Patent No. 587,676, dated August 3, 1897.

Application filed December 8, 1896. Serial No. 614,956. (No specimens.) Patented in England December 31, 1895, No. 24,980.

*To all whom it may concern:*

Be it known that we, WILLIAM MUIR MAC-KEAN, JAMES ANDERSON DUNLOP MACKEAN, and NORMAN MACGREGOR MACKEAN, subjects of the Queen of Great Britain and Ireland, and residents of Paisley, county of Renfrew, Scotland, have invented a certain new and useful Process of Degerming Maize, &c., (for which we have obtained a patent in Great Britain, No. 24,980, bearing date December 31, 1895,) of which the following is a specification.

This invention relates to an improved method of obtaining germs from maize or other cereals, either for that purpose only or in the processes preliminary to the production of starch, flour, or other derivatives of grain.

In practicing the invention in the case of maize or Indian corn (which may be taken as typical of other cereals) the grain is first steeped in warm water at a suitable temperature, as usually practiced in the manufacture of maize-starch. It is secondly ground between rollers or millstones so adjusted as to disintegrate the grain without destroying the structure of the germs. Thirdly, the resulting grist or magma is thrown upon a sieve having a revolving or reciprocating motion and lixiviated with water to wash out any starch particles which may have been disengaged in the process of disintegration. Fourthly, the grist is subjected to pressure by being conveyed on a traveling band and passed between rollers or is treated in centrifugal machines to deprive it of surplus moisture. Fifthly, the grist is mingled with water the specific gravity of which has been increased to a suitable density, such as 15° to 20° Twaddell, by the addition of salt or other soluble ingredient. Sixthly, the mixture is passed into a suitable tank or separator, provided with an apparatus for gently agitating the contents, such as an Archimedean screw, whereupon the germs rise to the surface and are floated off, while the remainder of the grist is conveyed by the screw to the end of the tank and removed by an elevator. Seventhly, the germs are thrown upon a sieve and lixiviated with water, while the grist is subjected to pressure between rollers or is treated in centrifugal machines for removal of the surplus moisture. Eighthly, the germs after having been washed are deprived of surplus moisture in the same manner as the grist and are thereafter dried. Any bran or other particles of grain which may adhere to the germs may be removed by contact with rotary brushes in a cylinder and separated by sieving or other means. The dried and purified germs are then ready for sale or may be treated by pressure to extract the oil they contain, the resulting cakes being suitable for cattle-feeding. Ninthly, the grist after having been deprived of surplus brine may be ground between millstones and used for the production of maize-starch, while the brine may flow to a reservoir for employment again in the separator.

In order that the various stages of the process may be more clearly understood, we have hereunto appended one sheet of drawings, illustrating the manner in which the same may be carried into practice.

As shown in the drawing, the grain is introduced from a hopper A, after having been steeped in warm water, as before described, into a mill B along with a stream of water from pipe $B^2$ to be ground to such a degree as will liberate the germs without destroying their structure, the resulting magma being drawn off by a pipe $b$, leading to suction branch of pump X, whereby it is thrown upon the sieve C, which, as shown, has a reciprocating motion imparted to it from a connecting-rod and eccentric, as at $c$, driven from any prime moving shaft. The grist or magma is washed with clear water which is forced from the pipe $C^2$ for the purpose of washing out any starch particles which have been already disengaged in the process of disintegration in the mill B. The grist is then treated in a hydro-extractor D to deprive it of surplus moisture, the water being drained off by the branch pipe $b'$, leading to the suction-pipe $b$ of the pump X, and the grist at intervals may be led by a pipe or passage E from the hydro-extractor D to a mixer F, which is fitted with an agitator, where it is mingled with water, the specific gravity of which has been increased to a suitable density, such as before stated, of 15° to 20°

Twaddell, by the addition of salt or other soluble ingredient. The mixture is passed into a suitable tank or separator G by a passage-way $f$ and is gently agitated by an Archimedean screw $g$, and the germs rising to the surface are floated off, assisted by an endless band H, consisting of a series of slats of the breadth of the tank G. The remainder of the grist is conveyed by the screw $g$ to the end of tank G and is removed by the elevator E, which is fitted with buckets of wire-cloth or perforated metal to permit of the grist being drained. The grist is treated in a hydro-extractor D' to remove the surplus moisture which is conveyed by the branch pipe $d'$ and main pipe $d$ back to the mixer F to be employed again. The grist is then conveyed by an Archimedean screw $d^2$ to an elevator E', which may deliver it into a mill B', where it may be further ground. The germs and brine being floated off from the tank G are led away by the suction-pipe $i$ of a pump I and are conveyed by the pipe $i'$ and thrown or discharged onto a sieve C', actuated in the same manner as sieve C, the brine being conveyed to a tank J and from same by a branch pipe $d'$ and main $d$ back to the mixer F for further use, while the germs remaining are delivered into the hydro-extractor $D^2$ to remove the surplus moisture, which is conveyed by branch pipe $d'$ and main $d$ back to the mixer F for further use, while the germs can be utilized in any well-known manner for the market.

We claim as our invention—

1. A process of degerming maize or other cereals consisting in first steeping the maize, then disintegrating the grain without destroying the structure of the germs, then washing away the starch particles disengaged in the process of disintegration, then depriving the grist of surplus moisture, then mixing it with water, the specific gravity of which has been increased to a suitable density by the addition of salt or other soluble ingredient, and agitating this mixture to separate the germs, substantially as set forth.

2. A process of degerming maize or other cereals consisting in steeping and disintegrating the grain, then washing away the starch particles disengaged during the process of disintegration, then depriving the grist of surplus moisture, and then mixing the grist with water, the density of which has been increased by the addition of salt or other soluble ingredient, substantially as set forth.

3. A process of degerming maize or other cereals, consisting in disintegrating the grain and then washing away the starch particles disengaged during the process of disintegration, and mixing the disintegrated grain, free from said starch particles, with water, the density of which has been increased by the addition of salt or other soluble ingredient, substantially as set forth.

In testimony whereof we have signed our names to this specification in the presence of two subscribing witnesses.

WILLIAM MUIR MacKEAN.
  JAMES ANDERSON DUNLOP MacKEAN.
  NORMAN MacGREGOR MacKEAN.

Witnesses:
  JOSEPH MUIR,
  GAVIN CRAWFORD.